United States Patent
Filipp

(10) Patent No.: US 8,678,458 B2
(45) Date of Patent: Mar. 25, 2014

(54) VEHICLE INTERIOR COMPONENTS WITH DECORATIVE STITCHING

(75) Inventor: William Filipp, Shelby Township, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 13/570,689

(22) Filed: Aug. 9, 2012

(65) Prior Publication Data

US 2014/0042767 A1 Feb. 13, 2014

(51) Int. Cl.
*B60R 13/02* (2006.01)

(52) U.S. Cl.
USPC .............................. 296/1.08; 296/70; 428/102

(58) Field of Classification Search
USPC ........ 296/1.08, 70, 146.7; 112/402, 420, 440, 112/439; 428/102, 31
IPC ....................................................... B60R 13/02
See application file for complete search history.

(56) References Cited

U.S. PATENT DOCUMENTS

| | | | |
|---|---|---|---|
| 3,847,699 A * | 11/1974 | Shaw et al. .................... | 156/251 |
| 4,769,278 A | 9/1988 | Kamimura et al. | |
| 5,382,398 A | 1/1995 | Dräxlmaier, Jr. | |
| 7,390,555 B2 * | 6/2008 | Shane ........................... | 428/151 |
| 7,922,956 B1 | 4/2011 | Scheidmantel et al. | |
| 8,039,091 B2 * | 10/2011 | Tilton et al. ................. | 428/195.1 |
| 2003/0168151 A1 * | 9/2003 | Wright et al. .................. | 156/93 |
| 2006/0197321 A1 * | 9/2006 | Saito ........................... | 280/730.2 |
| 2007/0014969 A1 * | 1/2007 | Olley et al. .................... | 428/104 |
| 2010/0013260 A1 * | 1/2010 | Vasko et al. .................... | 296/70 |
| 2011/0241316 A1 * | 10/2011 | Sauer et al. ................. | 280/728.3 |
| 2012/0313391 A1 * | 12/2012 | Kornylo ........................ | 296/1.08 |
| 2013/0009416 A1 * | 1/2013 | Wenzel et al. ................ | 296/1.08 |

FOREIGN PATENT DOCUMENTS

| | | |
|---|---|---|
| DE | 3206468 | 9/1983 |
| DE | 19800815 | 2/1999 |
| JP | 1141140 | 6/1989 |

* cited by examiner

*Primary Examiner* — Glenn Dayoan
*Assistant Examiner* — Pinel Romain
(74) *Attorney, Agent, or Firm* — Reising Ethington P.C.

(57) ABSTRACT

A vehicle interior component includes a decorative covering with one or more lines of decorative stitching sewn therethrough. Together with one or more ridge features, the decorative stitching can be part of a simulated seam formed in the decorative covering. A densified portion and/or a reduced thickness portion can be formed in the decorative covering along the intended stitch path and prior to addition of the decorative stitching to help reduce the effect of the stitching on the overall appearance of the simulated seam, such as the shape of the ridge feature(s). The decorative covering can be compressed along the intended stitch path in a thermoforming process, such as an in-mold graining process.

20 Claims, 3 Drawing Sheets

VEHICLE INTERIOR COMPONENTS WITH DECORATIVE STITCHING

TECHNICAL FIELD

The present disclosure relates generally to vehicle interior components that include decorative coverings and stitching.

BACKGROUND

Vehicle interiors utilize various types of decorative components to provide a desired aesthetic. Certain types of materials and components, such as leather or genuine wood trim, may traditionally provide a vehicle interior with a luxurious feel because the cost of such materials is usually high, making them affordable only to purchasers of expensive vehicles. One distinctive feature of leather trim materials is what may be termed a "cut-and-sew" look, where pieces of leather material are hand-sewn together, often with decorative stitching, to form a covering to fit the contours of various types of interior components. Some efforts have been made to simulate such a hand-sewn look to make it more affordable for use in less expensive vehicles.

U.S. Pat. No. 7,922,956 to Scheidmantel et al. describes one technique that purports to simulate a cut-and-sew look. The method taught by Scheidmantel includes molding a component from a plastic material using a mold that has the shape of a simulated sewn joint formed in the mold surface. When removed from the mold, the molded component includes a molded-in simulated sewn joint in the form of a pair of ridges with an indentation between the ridges. Scheidmantel teaches adding a thread-stitched seam parallel to the ridges to simulate a sewn joint.

SUMMARY

In accordance with one embodiment, a vehicle interior component includes a substrate having an outer surface and a decorative covering disposed over the substrate outer surface. The decorative covering also includes a densified portion, and a line of decorative stitching is sewn through the decorative covering along the densified portion.

In another embodiment, the densified portion is a reduced thickness portion.

In another embodiment, a ridge feature is formed in the decorative covering along the densified portion.

In another embodiment, the decorative covering is spaced away from the outer surface of the substrate along at least a portion of the densified portion.

In another embodiment, the decorative covering includes a decorative skin layer and an inner layer located between the substrate and the decorative skin layer.

In another embodiment, the vehicle interior component is an instrument panel.

In accordance with another embodiment, a vehicle interior component includes a substrate having an outer surface and a decorative covering disposed over the substrate outer surface. A line of decorative stitching is sewn through the decorative covering, and the decorative covering is spaced away from the outer surface of the substrate along the line of decorative stitching.

In another embodiment, the decorative covering includes a reduced thickness portion and the line of decorative stitching is sewn through the reduced thickness portion.

In another embodiment, a ridge feature is formed in the decorative covering generally parallel with the line of decorative stitching.

In another embodiment, another line of decorative stitching is sewn through the decorative covering parallel with the ridge feature so that the ridge feature is located between the lines of decorative stitching.

In accordance with another embodiment, a method of making a vehicle interior component having decorative stitching includes the steps of: (a) providing a decorative covering; (b) reducing the thickness and/or increasing the density of the decorative covering along a pre-determined stitch path; (c) subsequently sewing a line of decorative stitching through the decorative covering along the stitch path; and (d) disposing the decorative covering over a vehicle interior component substrate.

In another embodiment, step (b) includes compressing the decorative covering along the pre-determined stitch path.

In another embodiment, the method further includes forming a ridge feature in an outer surface of the decorative covering generally parallel with the pre-determined stitch path so that the ridge feature and the line of decorative stitching at least partly define a simulated seam after step (c).

In another embodiment, step (b) and the step of forming the ridge feature are performed simultaneously in an in-mold graining process.

In another embodiment, the method further includes attaching the decorative covering to the substrate in a lamination process.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more illustrative embodiments of the invention will hereinafter be described in conjunction with the appended drawings, wherein like designations denote like elements, and wherein.

DETAILED DESCRIPTION OF EMBODIMENT(S)

The following description is directed at various embodiments of vehicle interior components that include decorative stitching. Decorative stitching may be included as part of a simulated seam formed in a decorative covering. The structures and methods described herein may be useful to enhance the appearance of such seams to make them appear more realistic and/or to address certain problems that can arise when attempting to simulate the look of a functional seam. As described in greater detail below, a decorative covering can be fabricated with a densified portion and/or a reduced thickness portion so that the effect of the decorative stitching on the overall appearance of the simulated seam is reduced or eliminated. It is noted that the figures included here are not necessarily to scale, as certain components may be exaggerated, minimized, or omitted for clarity.

Figure 1:
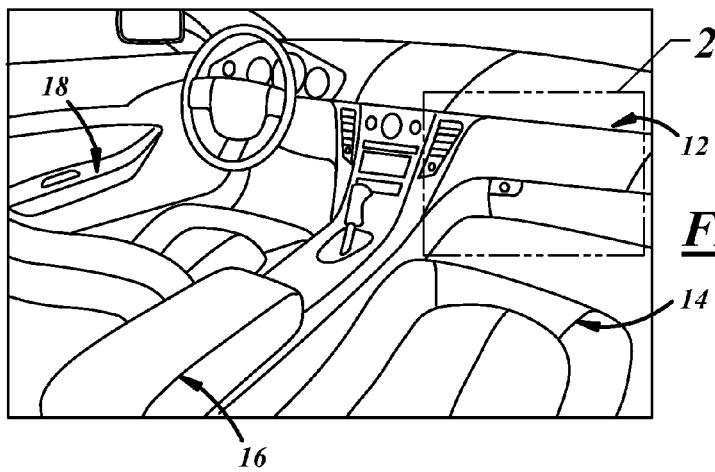
FIG. 1 is a perspective view of a vehicle interior, showing various vehicle interior components that may include decorative stitching.

Referring to FIG. 1, a vehicle interior is shown to illustrate various examples of vehicle interior components that can include coverings with decorative stitching. Instrument panel assembly 12, seat assembly 14, console assembly 16, and door panel assembly 18 may all include decorative coverings disposed over and/or attached to their respective component substrates. The arrows in the figure also point to example locations for seams and/or decorative stitching for each of the components. The decorative coverings disclosed herein may be used with any other interior component as well, such as steering wheel assemblies, shifter assemblies, etc.

Figure 2:
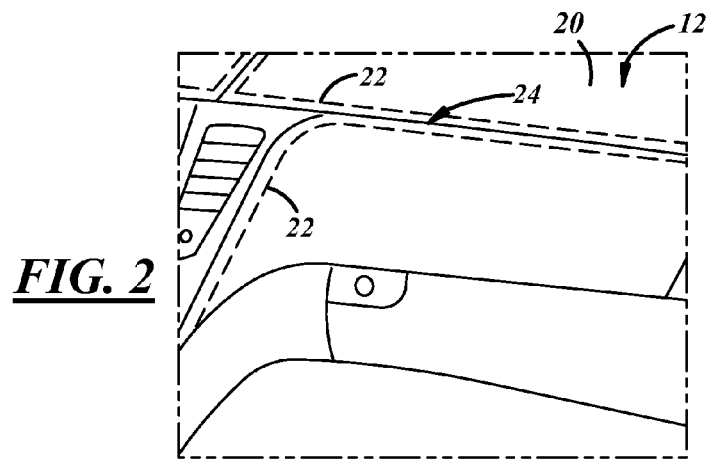
FIG. 2 is an enlarged view of FIG. 1, showing an instrument panel with decorative stitching.

FIG. 2 is an enlarged view of a portion of the instrument panel assembly 12 of FIG. 1. The instrument panel 12 includes a visible decorative covering 20 and one or more lines of decorative stitching 22. Each line of decorative stitching 22 may be included as part of a seam 24, whether a functional seam or a simulated seam. A functional seam is formed where two portions of covering material are attached to each other, with stitching for instance. A functional seam may include stitching that is purely functional to hold the two material portions together, it may include functional stitching that is also visible and decorative, or it may include both functional stitching and purely decorative stitching. A simulated seam is a feature formed in the panel 12 or other component to give the appearance of a functional seam where there is none. A line of decorative stitching 22 may be included even in the absence of a functional or simulated seam, to give the appearance that the decorative covering 20 is sewn to an underlying piece of material, for example. As used herein, the term "line of stitching" includes stitching sewn through the covering along a stitch path of any shape, whether rectilinear, curvilinear, or a combination thereof.

Figure 3:
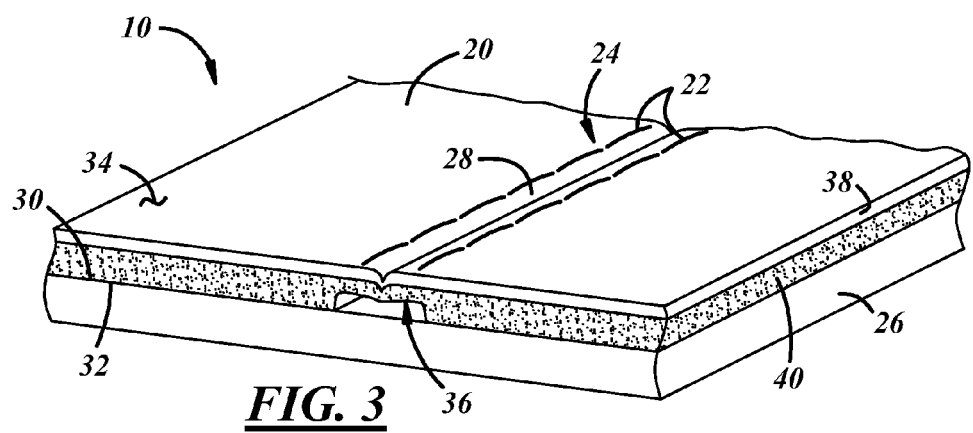
FIG. 3 is a cross-sectional perspective view of one embodiment of a vehicle interior component, including a simulated seam.

Referring now to FIG. 3, a cross-sectional view of a portion of an exemplary vehicle interior component 10 is shown, including a substrate 26, a decorative covering 20, and two lines of decorative stitching 22 sewn through the covering. In this example, the interior component 10 has a simulated seam 24, including the lines of decorating stitching 22 and a ridge feature 28 formed in the decorative covering 20. The ridge feature 28 is located between and generally parallel with the lines of stitching 22. The particular ridge feature 28 shown in FIG. 3 includes a V-shaped recess that simulates a location where two separate pieces of material are sewn together, while the portion of the covering 20 shown is actually a continuous piece of material from one side of the simulated seam 24 to the other. Together with the parallel lines of decorative stitching 22, the simulated seam 24 gives the appearance of a so-called French seam. Thus, an expensive cut-and-sew look can be achieved without the need for handling multiple separate pieces of material and without the need for functional stitching.

The substrate 26 forms the overall three-dimensional shape of the particular vehicle interior component and includes an outer surface 30. At least in the case of an instrument panel, the substrate 26 is partly structural in nature in that it supports and/or provides attachment locations for other vehicle components, like HVAC components, airbag components, etc. The substrate 26 can be formed from any suitable material such as filled or unfilled plastics, metals, or combinations thereof. In one embodiment, the substrate 26 is constructed from a material that includes a thermoplastic olefinic material such as polypropylene, and may be reinforced with 20-30% glass fiber. The substrate 26 thickness may range from about 2.0 mm to about 4.0 mm where plastic materials are used in its construction.

The decorative covering 20 overlies the substrate 26 to provide a desired aesthetic and may be attached to the substrate with a suitable adhesive or by other means. The covering 20 includes opposite inner and outer surfaces 32, 34 and is disposed over the substrate 26 so that the inner surface 32 faces toward the outer surface 30 of the substrate. At least a portion of the inner surface 32 is in contact with the substrate outer surface 30. The decorative covering 20 may also include a densified portion 36 with the line or lines of decorative stitching 22 sewn through the covering along the densified portion. The decorative covering 20 may be spaced away from the substrate 26 along the densified portion 36, as shown, with a gap between the opposing surfaces 30, 32. Alternatively or additionally, the densified portion 36 is a reduced thickness portion of the covering 20, as illustrated in the embodiment of FIG. 3. The densified portion 36 is characterized by a localized covering material density that is greater than the nominal density of the covering away from the line or lines of decorative stitching 22. Likewise, where portion 36 is a reduced thickness portion, it is characterized by a localized covering material thickness that is less than the nominal thickness of the covering away from the line or lines of decorative stitching 22. As described in further detail below, the densified and/or reduced thickness portion 36 of the covering 20 may be formed prior to the line or lines of decorative stitching 22 being sewn through the covering to enhance the appearance of the finished panel 10 and/or to prevent subsequent process steps from negatively affecting the appearance of the panel in the general area of the decorative stitching.

In the illustrated example, the covering 20 includes a decorative skin layer 38 and an inner layer 40 located between the skin layer and the substrate 26. In the bi-layer construction shown, the skin layer 38 includes the covering outer surface 34, and the inner layer 40 includes the covering inner surface 32. In other embodiments, the covering 20 may be formed from a single layer of material, or it may include one or more additional layers between the skin layer 38 and the inner layer 40. The skin layer 38 is generally decorative and may be constructed from a pliable material such as those typically used in vehicle interiors, including TPO, TPE, PVC, PUR, leather, simulated leather, or other types. Material selection may be based on a number of factors, including the desired type of texture for the outer surface 34, the tactile feel of the material, cost, processability, or others. The skin layer 38 may include a grain or texture formed in the outer surface 34, as well. The inner layer 40 may be constructed from a compressible foam material to provide a cushioned feel to the covering 20 and to the vehicle component 10. Examples of foam materials for the inner layer 40 include polyolefin-based foam, polyurethane foam, acrylic-based foam, or polyester foam, to name a few. Other non-foam materials such as felt or textile fibers may be used as well. The layers 38 and 40 may be co-extruded, laminated, adhesively bonded or otherwise attached to each other to form the covering 20 separately from substrate 26.

Individual layer thicknesses may vary, but the overall nominal thickness of the decorative covering 20 may range from about 0.2 mm to about 6 mm, in accordance with the individual layer thicknesses, and preferably ranges from about 1.0 mm to about 4.0 mm. The thickness of the skin layer 38 may range from about 0.4 mm to about 1.4 mm, and preferably ranges from about 0.4 mm to about 0.8 mm. The selected skin layer thickness depends on several variables such as material type, manufacturability, and desired aesthetic, to name a few. The thickness of the inner layer 40 may range from about 0.5 mm up to about 5.0 mm or higher, depending on the desired tactile feel of the vehicle interior component. In one embodiment, the covering 20 has an overall thickness of about 2.0 mm, where the skin layer 38 is about 1.0 mm thick and the inner layer 40 is about 1.0 mm thick. In another embodiment, the skin layer is about 0.5 mm thick, and the inner layer is about 3.5 mm thick, so that the overall covering thickness is about 4.0 mm. Of course, these are non-limiting examples, as there are several suitable combinations of layer thicknesses. These example ranges are nominal ranges, as some covering features can locally affect covering thickness.

One manner of forming the densified or reduced thickness portion 36 of the decorative covering 20 is by thermoforming the covering. Thermoforming is any process that includes the combined use of heat and mechanical force to change the shape of a component. In a typical thermoforming process for polymeric sheets of material, a flat sheet of material is heated to a particular softening temperature and forced against a forming tool surface having the desired finished contour. The force can be applied mechanically by another portion of the forming tool contacting and pressing the material against the forming tool surface, and/or the force can be applied by positive or negative fluid pressure acting to press or draw the material against the forming tool surface.

Figure 4:
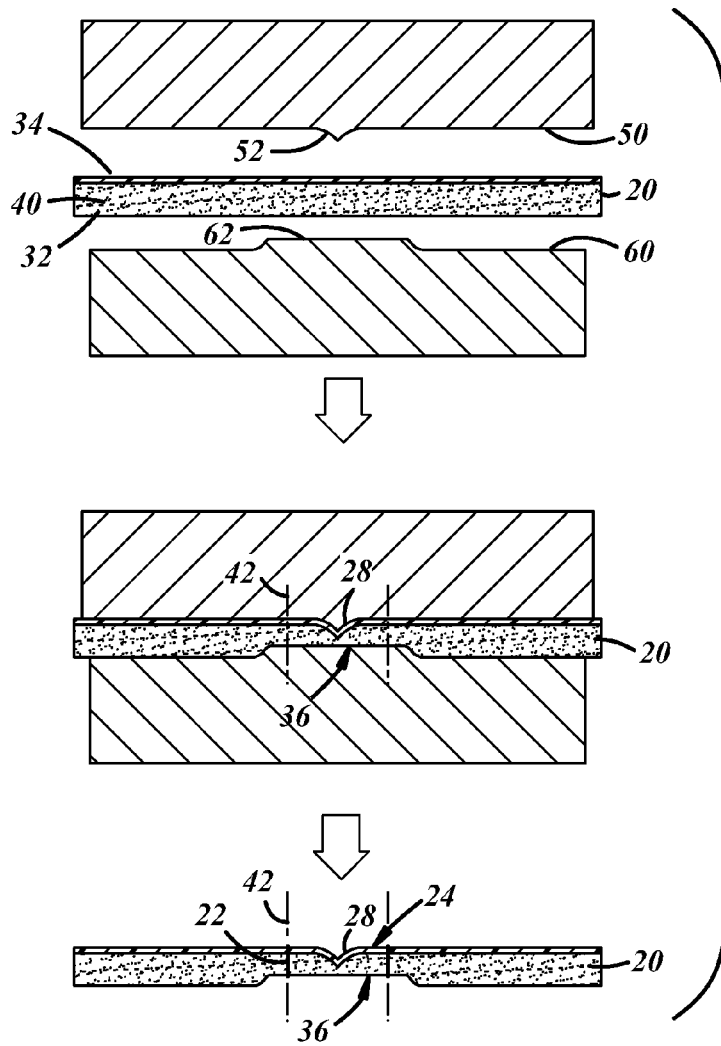
FIG. 4 includes sequential cross-sectional views of a decorating covering undergoing a thermoforming process prior to addition of the decorative stitching.

FIG. 4 illustrates one example of a suitable thermoforming process as part of a method of making a vehicle interior component. In this example, the decorative covering 20 is provided in sheet form as a bi-layer material such as described above. The covering 20 is placed between opposing forming tool surfaces 50, 60 with respective standing features 52, 62. The covering 20 is heated to a suitable forming temperature, either before or after being placed between the tool surfaces 50, 60. The covering 20 is forced against the forming tool surface 50 to impart the desired contour to the outer surface 34. In this case, the standing feature 52 forms the ridge feature 28 of the finished simulated seam 24. The covering 20 is also forced against the opposing forming tool surface 60, where the standing feature 62 forms the densified portion 36 of the covering, which in this case is also a reduced thickness portion. The densified portion 36 has a higher material density than other portions of the covering 20 due to compression of the covering material during the thermoforming operation. In particular, where the inner layer 40 is a foam material, the densified portion 36 includes foam material with a higher density than the foam material of the remainder of the inner layer—i.e, with a higher density than before the thermoforming operation.

The thermoforming process may be a vacuum thermoforming process, in which a reduced pressure is provided at one or both of the tool surfaces 50, 60. For example, in a negative vacuum thermoforming process, a reduced pressure is provided at the forming tool surface 50 that comes into contact with the outer surface 34 of the covering 20. This type of process can help provide sharper or more defined features in the outer surface of the covering, and in some cases can be used to form undercut features in the covering. Negative vacuum thermoforming may also be used to form a grain or texture in the outer surface 34 of the covering by including the desired grain or texture on the forming tool surface 50. This type of process may be referred to as an in-mold graining (IMG) process. While an IMG process does not necessarily require the opposing mold surface 60, it is provided in the example of FIG. 4 to form the densified portion 36 of the covering. In one particular embodiment, the densified portion 36 is formed in the covering 20 along a pre-determined stitch path 42 in an IMG process that includes moving the opposing forming tool surfaces 50, 60 toward each other so that the tool surfaces are in contact with opposite surfaces of the covering.

In another embodiment, the thermoforming process is a positive vacuum thermoforming process in which a reduced pressure is provided at the forming tool surface 60 that contacts the inner surface 32 of the covering 20. For example, a pre-grained covering material may be provided, and the densified portion 36 can be formed by drawing the inner surface 32 of the covering 20 against the forming tool surface 60, including the standing feature 62. These are of course only examples of processes useful to form the densified and/or reduced thickness portion 36 in the decorative covering. For example, features 52 and 62 of the forming tool surfaces need not always be standing features. For instance, feature 52 could be a recessed feature in the forming tool surface 50, resulting in a standing ridge feature in the finished covering, and feature 62 could be sized to form the densified portion 36 by compressing the covering 20 along the intended stitch path 42. In other examples, a heated tool surface in the shape of the intended stitch path 42 is pressed against the inner surface 32 of the covering 20, or a heated tool surface is pressed against and moved along the inner surface of the covering along the intended stitch path 42.

Figure 5:
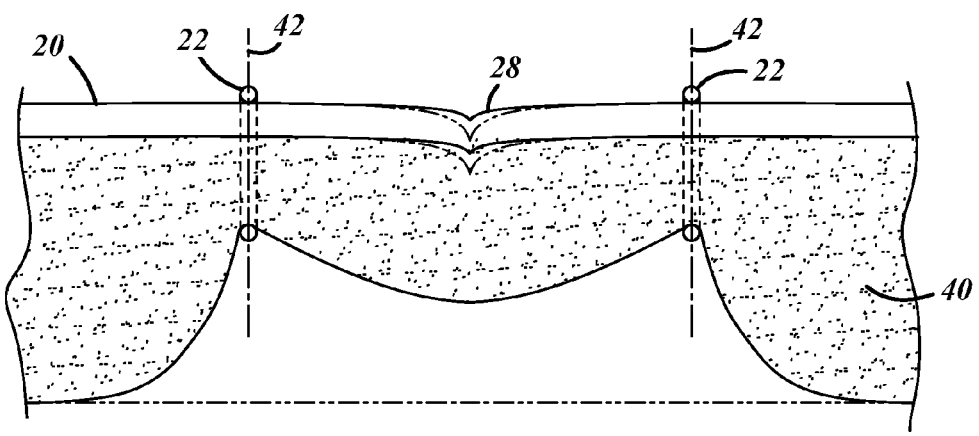
FIG. 5 is a cross-sectional view of a decorative covering where no densified or reduced thickness portion is formed in the covering before the decorative stitching is added.

As shown in FIG. 4, the line(s) of decorative stitching 22 can be sewn through the covering 20 after portion 36 is formed. The densified portion 36 can help prevent the decorative stitching from adversely affecting the appearance of the covering 20, particularly where other features, such as the ridge feature 28, have already been formed to the desired shape. For instance, one problem that may be encountered when sewing stitching through the decorative covering is localized compression of the covering material between top and bottom portions of the individual loops of thread. This problem is depicted in FIG. 5, where parallel lines of decorative stitching 22 are shown sewn through a decorative covering 20 that does not include a densified or reduced thickness portion along the intended stitch path 42. The shape of the covering 20 in cross-section prior to the addition of the lines of stitching 22, including the ridge feature 28, is shown in phantom view. The covering 20 and, in this particular example, the inner layer 40 is compressed along the lines of stitching 22 when they are sewn through the covering. As shown, one result is that the portion of the inner layer 40 between the two lines of stitching 22 is also compressed. Though the amount of compression in-between the lines of stitching 22 is less than the amount of compression directly along the lines of stitching, it may still affect the outer appearance of the covering 20. For example, when the inner layer 40 is compressed directly beneath the ridge feature 28, the shape of the ridge feature may change, as shown. In the illustrated example, the lines of stitching 22 may induce stresses in the portion of the inner layer 40 located between the lines of stitching 22 that can tend to "open" the ridge feature 28 and possibly lessen the sharpness of the feature. Forming the above-described densified portion in the covering along the intended stitch path 42 before adding the decorative stitching, via pre-compression of the covering in a thermoforming process or by other means, can help reduce or eliminate this effect.

In some cases, changes in the shape or appearance of the covering may not be noticeable until the covering is subjected to subsequent process steps that include heat and/or pressure. For example, the stitched covering may be attached to the substrate in a lamination process in which a lamination tool presses the covering against the substrate. The lamination tool can be heated and/or the opposing surfaces of the substrate and covering can be heated prior to application of the pressure. An optional adhesive layer can be disposed between the substrate and covering as well, such as a heat-activated or curable adhesive. Without the above-described densified or reduced thickness portion, the stresses induced in the covering material by the line(s) of stitching can relax, thus loosening the thread and/or changing the shape of the ridge feature.

Figure 6:
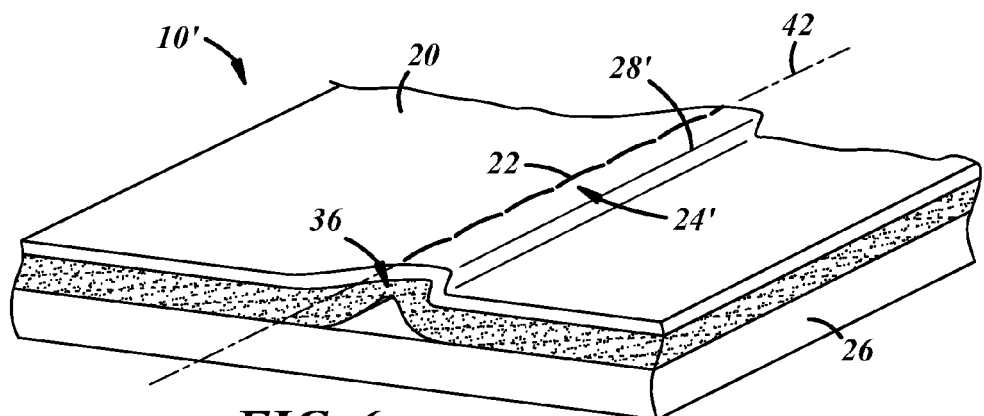
FIG. 6 is a cross-sectional perspective view of another embodiment of a vehicle interior component, including a simulated seam.

These and other benefits of forming a densified portion in the decorative covering are not limited to coverings with dual lines of stitching or simulated French seams. For example, FIG. 6 illustrates a portion of vehicle interior component 10' with a different type of simulated seam 24' that includes only a single line of stitching 22 alongside an upstanding ridge feature 28'. This configuration may simulate the look of two separate pieces of material overlapped and sewn together at the overlap, where the ridge feature 28' gives the appearance of a double layer of material. When formed prior to sewing the line of stitching 22 through the covering 20, the densified portion 36 can help lessen the effect the line of stitching has on the shape of the ridge feature 28' and on the overall appearance of the simulated seam 24'.

Figure 7:
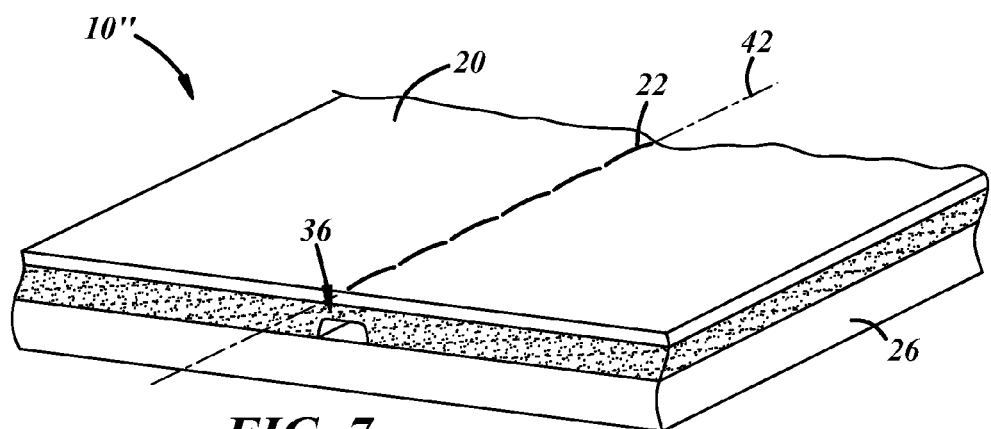
FIG. 7 is a cross-sectional perspective view of another embodiment of a vehicle interior component, including decorative stitching.

In the example shown in FIG. 7, the vehicle interior component 10" includes a line of stitching 22 with no corresponding ridge feature. This configuration can give the appearance that the covering 20 is sewn to an underlying piece of material and highlights additional benefits of the densified portion 36. For example, the densified portion 36 can be used to affect the thread tension necessary during the sewing operation and/or to affect the appearance of the line of stitching 22 at a given thread tension. With the covering material(s) pre-compressed along the intended stitch path 42, the finished line of stitching 22 can be made more prominent because the thread itself is not compressing the covering material as much and can thus be made less tight against the outer surface 34 of the covering 20. This can provide the covering with a more realistic tactile feel. Where the densified portion 36 is also a reduced thickness portion as shown, less overall material thickness along the line of stitching 22 can also reduce the amount of thread required in the finished component and the total amount of material the sewing needle must pass through.

One embodiment of a method of making a vehicle interior component having decorative stitching includes the steps of: providing a decorative covering; reducing the thickness and/or increasing the density of the decorative covering along a pre-determined stitch path; subsequently sewing a line of decorative stitching through the decorative covering along the stitch path; and disposing the decorative covering over a vehicle interior component substrate. As described above, the thickness of the covering can be reduced and the density of the covering can be increased along the intended stitch path by compressing the decorative covering along the pre-determined stitch path. Alternatively, the thickness of the covering may be reduced by methods that do not densify the reduced thickness portion, such as removing material from the inner surface of the covering. Many of the above-described benefits can be achieved by reducing the thickness of the covering along the intended stitch path even without densification of the covering material. Likewise, skilled artisans armed with the teachings presented herein may devise other techniques for providing a densified portion without necessarily reducing the thickness of the covering, such as selectively hardening or otherwise treating the covering along the intended stitch path or providing a higher density foam insert along the stitch path. These exemplary method steps may be part of an overall method having more steps where the individual steps are broken into multiple other steps or additional steps are added before, after, simultaneous with, or between those described above.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle interior component, comprising:
   a substrate having an outer surface;
   a decorative covering disposed over the substrate outer surface, the decorative covering having a densified portion; and
   a line of decorative stitching sewn through the decorative covering along the densified portion.

2. A vehicle interior component as defined in claim 1, wherein the densified portion is a reduced thickness portion.

3. A vehicle interior component as defined in claim 1, further comprising a ridge feature formed in the decorative covering along the densified portion.

4. A vehicle interior component as defined in claim 1, wherein the decorative covering is spaced away from the outer surface of the substrate along at least a portion of the densified portion.

5. A vehicle interior component as defined in claim 1, wherein the decorative covering includes a decorative skin layer and an inner layer located between the substrate and the decorative skin layer.

6. A vehicle instrument panel according to claim 1.

7. A vehicle interior component, comprising:
   a substrate having an outer surface;
   a decorative covering disposed over the substrate outer surface, the decorative covering having an inner surface in contact with the outer surface of the substrate; and
   a line of decorative stitching sewn through the decorative covering, wherein the decorative covering is spaced away from the outer surface of the substrate along the line of decorative stitching.

8. A vehicle interior component as defined in claim 7, wherein the decorative covering includes a reduced thickness portion and the line of decorative stitching is sewn through the reduced thickness portion.

9. A vehicle interior component as defined in claim 7, further comprising a ridge feature formed in the decorative covering generally parallel with the line of decorative stitching.

10. A vehicle interior component as defined in claim 9, further comprising another line of decorative stitching sewn through the decorative covering parallel with the ridge feature so that the ridge feature is located between the lines of decorative stitching.

11. A method of making a vehicle interior component having decorative stitching, comprising the steps of:
   (a) providing a decorative covering;
   (b) reducing the thickness and/or increasing the density of the decorative covering along a pre-determined stitch path;
   (c) subsequently sewing a line of decorative stitching through the decorative covering along the stitch path; and
   (d) disposing the decorative covering over a vehicle interior component substrate.

12. The method of claim 11, wherein step (b) comprises compressing the decorative covering along the pre-determined stitch path.

13. The method of claim 11, further comprising the step of: forming a ridge feature in an outer surface of the decorative covering generally parallel with the pre-determined stitch path so that the ridge feature and the line of decorative stitching at least partly define a simulated seam after step (c).

14. The method of claim 13, wherein step (b) and the step of forming the ridge feature are performed simultaneously in an in-mold graining process.

15. The method of claim 11, further comprising the step of: attaching the decorative covering to the substrate in a lamination process.

16. A vehicle interior component as defined in claim 1, wherein the decorative covering includes a decorative skin layer and a foam inner layer between the substrate and the decorative skin layer, and the line of decorative stitching is sewn through skin layer and the foam inner layer.

17. A vehicle interior component as defined in claim 16, wherein the densified portion includes foam material with a higher density than the foam material of the remainder of the inner layer.

18. A vehicle interior component as defined in claim 7, wherein the decorative covering includes a decorative skin layer and a foam inner layer between the substrate and the decorative skin layer so that the foam inner layer is spaced away from the outer surface of the substrate along the line of decorative stitching.

19. The method of claim 11, wherein the decorative covering provided in sheet form in step (a) and includes a decorative skin layer and a foam layer, and step (b) includes reducing the thickness and/or increasing the density of the foam layer along the pre-determined stitch path.

20. The method of claim 11, wherein step (d) is performed after step (c).

* * * * *